(12) United States Patent
Weedlun

(10) Patent No.: US 11,351,767 B2
(45) Date of Patent: Jun. 7, 2022

(54) HIGH LOFT MATERIAL TRANSFER AND METHOD OF MANUFACTURE

(71) Applicant: Paul Weedlun, Fulton, MD (US)

(72) Inventor: Paul Weedlun, Fulton, MD (US)

(*) Notice: Subject to any disclaimer, the term of this patent is extended or adjusted under 35 U.S.C. 154(b) by 0 days.

(21) Appl. No.: 17/134,866

(22) Filed: Dec. 28, 2020

(65) Prior Publication Data

US 2021/0197541 A1    Jul. 1, 2021

Related U.S. Application Data

(60) Provisional application No. 62/953,782, filed on Dec. 26, 2019.

(51) Int. Cl.
   *B32B 37/26* (2006.01)
   *B32B 38/18* (2006.01)
   *B32B 38/00* (2006.01)

(52) U.S. Cl.
   CPC .......... *B32B 37/26* (2013.01); *B32B 38/0004* (2013.01); *B32B 38/145* (2013.01); *B32B 38/1858* (2013.01); *B32B 2037/268* (2013.01); *B32B 2405/00* (2013.01)

(58) Field of Classification Search
   CPC ............... B32B 38/145; B32B 38/0004; Y10T 156/1052; Y10T 156/108; B41M 5/035; B41M 5/382; B44C 1/162; B44C 1/165; B44C 1/228; B29C 66/00145
   See application file for complete search history.

(56) References Cited

U.S. PATENT DOCUMENTS

| | | | |
|---|---|---|---|
| 6,689,532 B1 * | 2/2004 | Wexler | B32B 38/14 156/235 |
| 8,377,246 B2 * | 2/2013 | Weedlun | G09F 3/04 156/253 |
| 2007/0039682 A1 * | 2/2007 | Drake | B44C 1/1712 156/230 |

* cited by examiner

*Primary Examiner* — Carson Gross
(74) *Attorney, Agent, or Firm* — Royal W. Craig; Gordon Feinblatt LLC

(57) ABSTRACT

A method for manufacturing a thermal transfer from a high-loft substrate such as velvet. The method begins with a high-loft material sheet. The sheet is registered in a vacuum press, and a vacuum is applied to one side. A sublimation graphic is printed onto an opposing side of the high-loft material sheet. Next, an adhesive layer is laminated onto the opposing side of the printed sheet. The sheet is optionally laser-etched on the printed side, and is laser-cut into a desired shape. A protective release sheet is applied over the printed graphic. The method makes it possible to sublimation-print the transfer onto high-loft fabric such as velvet and yet still retain fine graphical registration and detail.

14 Claims, 2 Drawing Sheets

HIGH LOFT MATERIAL TRANSFER AND METHOD OF MANUFACTURE

CROSS-REFERENCE TO RELATED APPLICATIONS

The present application derives priority from U.S. Provisional Patent Application 62/953,782 filed 26 Dec. 2019.

BACKGROUND OF THE INVENTION

1. Field of the Invention

The present invention generally relates to heat activated transfers and transfers that are multi-colored printed indicia onto high loft and piled material to create single and multi-layered transfer for application onto apparel and softgoods.

2. Description of the Background

"High loft" materials typically incorporate a fiber structure that contains more air than fiber, e.g., a lofty, low-density fiber matrix. High loft materials are characterized by their lower density, higher porosity, and heavy pile (the raised surface of the fabric). High loft materials can be woven or non-woven, and include materials such as fleece, nap knits, velvet, chenille stitched fabric. High-loft non-woven fabrics usually have a lower bulk density because they have more pore space than more compacted woven fabrics. High-loft non-woven fabrics include fleece, carpet, velour, corduroy, felt and the like. The porosity of high-loft non-wovens can reach >98%. As used herein, the phrase "high loft material" refers to a material which has a thickness in excess of 1.5 mm and a relatively low bulk density less than 500 g/m3 (where bulk density is calculated by dividing the basis weight of the material by the bulk. High loft pile fabrics are characterized by tufts or loops of fibers or yarns that give a plush appearance. Pile fabrics exist in many forms such as velvet, terry towel, chenille and perhaps most commonly, pile carpets. They can be made by numerous processes including tufting, knitting, knotting, flocking and nonwovens.

Flocking is faster and less expensive than other pile fabric production processes. In the flocking process, short pre-colored fibers, cut from natural or synthetic fibers, are spread onto a fabric surface coated with adhesive; the fabric is then cured. Unfortunately, the durability of flocked pile is relatively low and largely dependent on the bonding strength of the adhesive. Embossed fabrics have raised or projected figures or designs in relief on fabric surfaces. Embossed surfaces are usually produced by passing the fabric through engraved, heated rolls under heavy pressure to give a raised effect. Laser-engraving is another method as described in U.S. Pat. No. 8,377,246 to Weedlun.

Regardless of the particular type of fabric or method of production, it is difficult to print on high loft materials, and especially pile fabrics, due to their porous tufted nature. The print fails to retain fine graphical detail and separation of color. Thus, the color fades or dithers rather easily. It is especially difficult to employ digital printing on flocked fabrics. For example, sublimation printing is accomplished by a four-color process where small droplets of cyan, magenta, yellow and black ink are deposited onto a transfer paper medium. The transfer paper is then heat pressed or calendared to an article to gasify the inks into the fibers. This method provides a dyed surface with no variance in hand feel to the fabric itself. Previous methods have employed heated rollers, heated transfer presses and the like which forcibly compress the transfer material onto the textile material. These methods use a combination of heat and direct pressure that is introduced to the textile material and transfer medium through a metal plate, drum, roller, or the like that is either automatically or manually applied for a period of time sufficient to turn the dyes in the transfer medium into the gaseous state. The dye vapor is then transferred from the transfer medium to the surface of the textile material where the dye adheres to the fabric.

Sublimation printing onto pile fabric has had limitations. The sublimation printing press contacts the fabric surface and print is sublimated primarily onto the contacted surface side. For example, when direct pressure is applied to both the transfer material and the textile material, the pressure tends to crush and ruin the surface of the fabric of the textile material. This problem is exacerbated by the fact that pressure is applied to the fabric of the textile material for an extended period of time. The crushing of the fabric of the textile material is particularly problematic with high-loft pile fabrics that have surface interest such as fleece, carpet, velour, corduroy, felt and the like. It is difficult to maintain registration of the fabric to the print, which greatly degrades graphical integrity during the application process.

In addition, previous methods of sublimation transfer printing produce final products that have inadequate penetration of the dye into the fabric of the textile material. The pile material being crushed onto the base also impedes dyeing to base of the fabric which creates a lighter ground material. It is preferred to have the dye thoroughly penetrate deep within the pile or nap of the textile fabric. This gives the fabric of the textile material a more desirous appearance and better resists color wear. The problem is acute for pile fabrics characterized by the tufts or loops of fibers or yarns that stand up from the base fabric. It is very difficult to retain fine graphical registration and detail, and prior methods of sublimation printing on pile fabrics have failed to achieve this. Depending on how fibers lay down under pressure during the sublimation process, colors become blended and muddled, and on pile fabric graduated.

It is therefore an object of the present invention to provide an improved method of producing a digitally-printed pile high-loft material transfer by sublimation printing which can be made with a wide range of patterns. In an embodiment, the high-loft transfer can have dimensional levels created by melting or fusing surface fibers using a laser to create a three-dimensional emblem.

SUMMARY OF THE INVENTION

According to embodiments of the invention, a high-loft material transfer can be made from a high-loft substrate such as velvet. A graphic can be sublimation printed onto the substrate utilizing vacuum press and then an adhesive layer can be applied to a second side of the velvet pile substrate. This type of press allows the pile or loft of the material to remain while the vacuum force helps transport the gaseous sublimation dyes through the material. The velvet pile substrate can be cut into a selected shape using a laser, or laser-etched to display a three-dimensioned appearance or textured surface profile, and a carrier sheet with a pressure sensitive adhesive can be applied over the cut graphic to hold potential multiple graphical pieces in registration to maintain graphical integrity during transport and in the application process.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

The present invention is a high-loft material transfer made from any suitable high-loft substrate such as velvet. Velvet is a soft tufted fabric often associated with nobility and religious figures due to its rich, luxurious feel and appearance. Authentic velvet is woven on a special loom, or knitted on a double needle bar Raschel knitting machine with two faces and then split in to two pieces by slitting between the two faces leaving yarn ends that have been cut. This is a complicated process and velvet to date remains a fairly costly fabric. There are inexpensive imitation velvets such as flocked velvet, which is created by depositing many small fiber particles (called flock) onto a fabric surface. However, the imitations lack the texture of authentic velvet. Velvet is generally more durable than flocked pile fabrics but its pile can be notoriously more difficult and expensive to print embellishments on using conventional techniques. Consequently, velvet is rarely if ever used in the production of multi-colored printed appliques and is normally only used as a solid colored dyed fabric layer. The present invention makes it possible with an improved method of producing a digitally-printed velvet pile transfer by sublimation printing using a vacuum table press maintaining sufficient gap through the sublimation process to avoid compressing or flatten the pile or lofted material, allowing the creation of multi-colored complex graphics with a wide range of patterns. One skilled in the art of sublimation printing will understand the need to create the proper set of conditions; time, temperature, vacuum pressure and spacing to uniformly and accurately transfer the print. Although the invention is herein described using a velvet substrate for example, one skilled in the art will understand that the invention is suitable for any high loft material, including woven and non-woven fabrics, especially pile fabrics due to their porous tufted nature.

Figure 2:
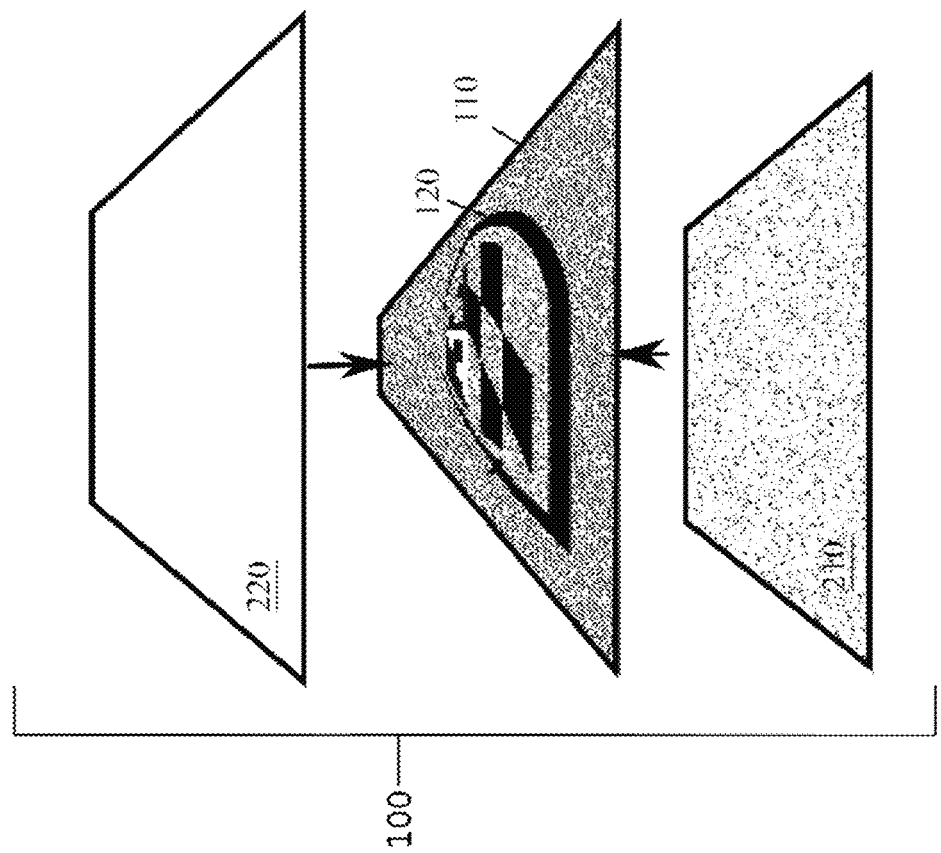
FIG. 2 is a side exploded view of an example velvet pile transfer, according to embodiments of the invention.
Figure 1:
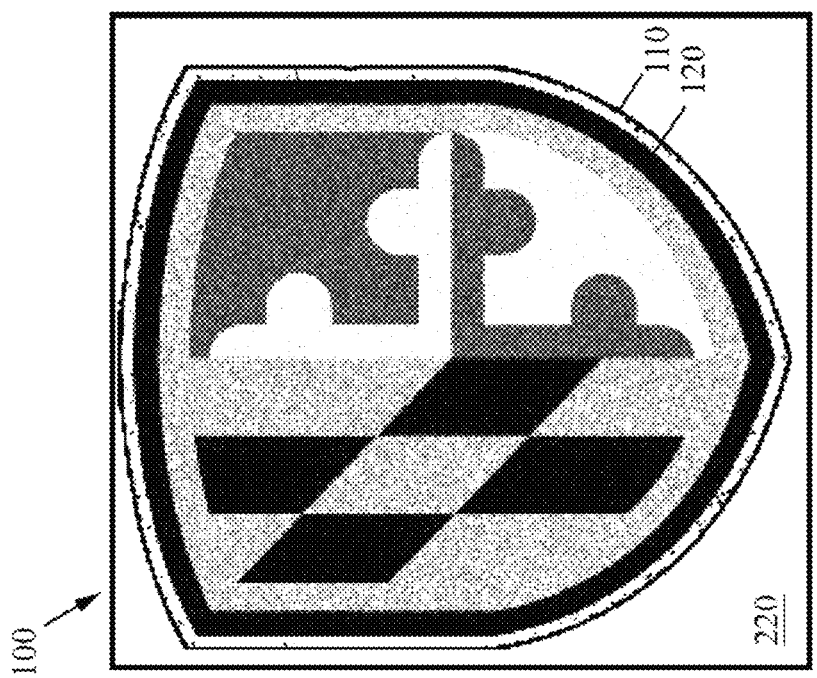
FIG. 1 is a front perspective view of an example velvet pile transfer, according to embodiments of the invention.

With combined reference to FIGS. 1 and 2, a velvet pile transfer 100 can generally include a high-loft pile fabric substrate such as velvet 110. Initially, velvet substrate 110 may be optionally prepared for print as described below. Velvet substrate 110 is then digitally printed with a graphic 120 using dye sublimation printing. A thermoplastic adhesive layer 210 is then laminated onto the non-printed side of the substrate sheet 110. Next, an optional etching/cutting phase occurs including optional laser-etching of the printed side of the velvet pile transfer 100 to texturize and create a 3D textured appearance, followed by laser-cutting of the transfer 100 from the substrate. The foregoing process results in a velvet transfer 100 bearing a combination of digitally-printed elements such as letters, logo graphics and numbers or other indicia, which may include an 3D textured appearance from the combination of etching and printing, all in a form that is easily heat-sealed or pressure-sealed to a garment or other textile. A release sheet 220 is temporarily secured overtop printed substrate layer 110 and graphic 120, but is removed prior to application. Release sheet 220 may be any suitable release-coated paper or film to protect and maintain the graphic 120 and printed substrate layer 110 prior to application to the target product. The release sheet 220 is simply peeled away and discarded after application of the transfer to the target product.

Figure 3:
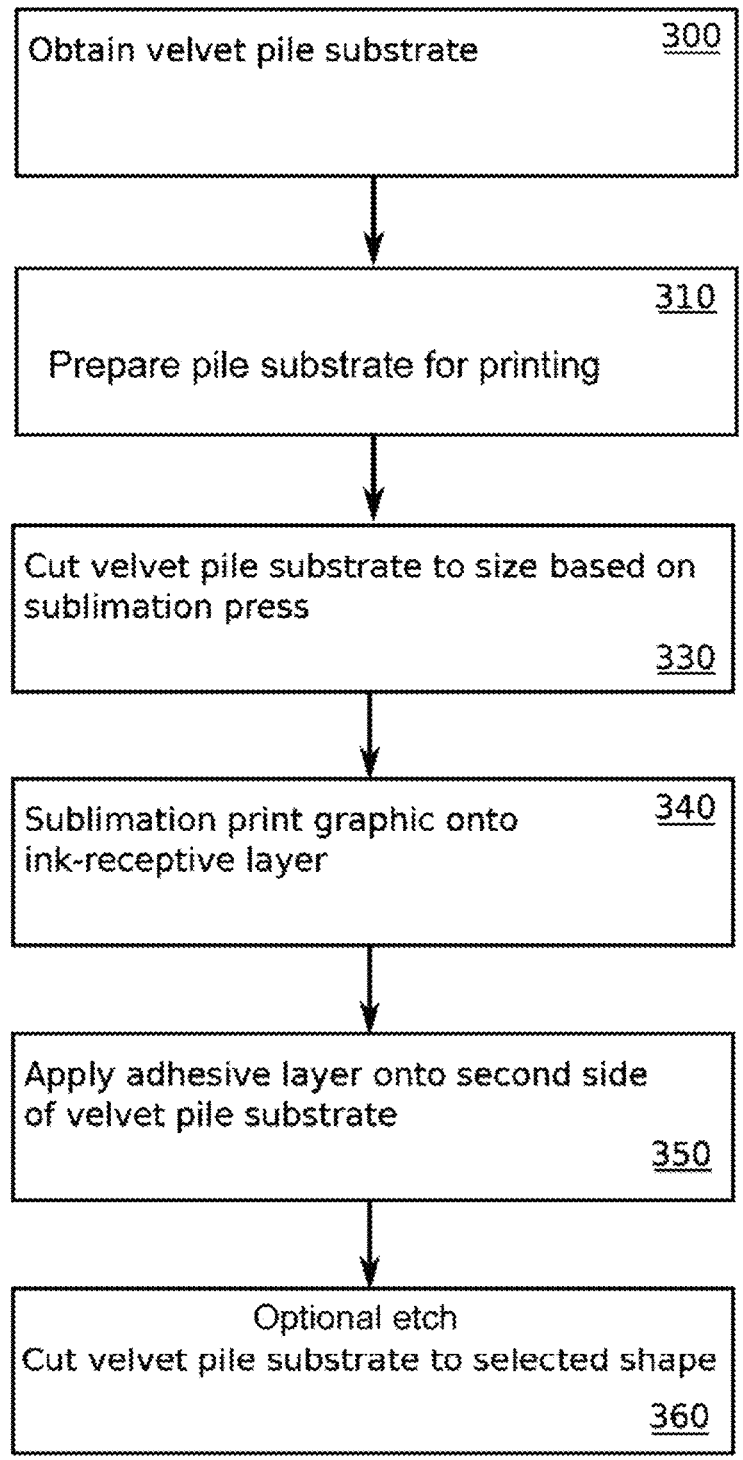
FIG. 3 is a flow chart illustrating example construction steps for manufacture of an example velvet pile transfer, according to embodiments of the invention.

FIG. 3 is a flow chart illustrating example construction steps for manufacture of an example velvet pile transfer 100, according to an embodiment of the invention.

At step 300 a high-loft pile substrate 110 is obtained. A high-loft pile substrate 110, according to embodiments of this invention, can be formed from any material suitable for the purposes of this invention. For example, the high-loft pile substrate 110 can be velvet formed from polyester, such as a white polyester or acrylic.

At step 310 velvet pile substrate 110 is optionally prepared for sublimation printing. It may be necessary to prepare velvet pile substrate 110 to maintain a sharp image and not deteriorate the image quality of the pattern. Velvet pile substrate 110 can be prepared in accordance with any procedure suitable to prepare it to maintain graphical integrity. For example, in some instances velvet pile substrate 110 may be coated with a sublimation enhancer to provide a sublimation compatible coating that enhances color of sublimation print. A variety of sublimation enhancers are commercially available and one skilled in the art would be familiar with the steps required for these purposes.

Velvet pile substrate 110 can be cut or otherwise adjusted to conform to the sublimation vacuum press at step 330. For example, velvet pile substrate 110 can be cut into pieces sized to fit inside the sublimation vacuum press and with at least a 1-3 centimeter (cm) margin exceeding the graphics (s) to be printed. One skilled in the art will understand that a single piece may be used to create multiple transfers.

At step 340, a graphic 120 can be sublimation printed onto the prepared velvet substrate 110. The sublimation printing can be performed in accordance with a sublimation vacuum printing technique suitable for the purposes of this invention. For example, a paper digital sublimation printing technique may be used in which sublimation paper in weight range of from 70 grams to 130 grams per square meter is obtained. A selected graphic can be digitally printed onto the sublimation paper using conventional color profiling software to achieve desired graphic 120. Prepared and sized velvet pile substrate 110 can be placed into a sublimation vacuum press, and the printed sublimation paper 120 can be placed over the prepared substrate 110. A combination of heat and vacuum pressure with proper spacing sufficient to allow good paper contact while not crushing, compressing or laying over the pile of the velvet can then be applied to the printed sublimation paper and velvet pile substrate 110 to cause the dye of the graphic to undergo sublimation (convert from solid to gaseous phase). The gaseous dye can then move from the printed sublimation paper to the surface of the velvet pile substrate 110 where the dye can adhere to the surface of the pile or nap of velvet pile substrate 110 as well as the base of velvet pile substrate, when sublimating felted polyester or acrylic the dyes will penetrate down into the fibers below the surface 110. The sublimation vacuum press is preferably configured to generate a level of vacuum to optimize dye penetration and time and temperature with sufficient space to avoid compressing the characteristics of velvet pile substrate or felt fabric structure 110. For example, in embodiments where velvet pile substrate 110 is formed from polyester fibers, the velvet pile substrate 110 can undergo a dwell time between 45 to 90 seconds at a pressure setting between 60 to 100 bar and a temperature setting between 190 Celsius (C) to 210 C with spacing being variable based on the loft of the pile. This ensures that the yarns or fibers are not laid down and that more uniform dye uptake takes place within the 3D dimensional matrix, and not preferentially at the surface. One skilled in the art will understand that the dwell time/pressure/temperature settings may vary with other materials.

After sublimation printing, an adhesive layer 210 is applied to a second side of velvet pile substrate 110 at 350. For example, velvet pile substrate 110 can be removed from the vacuum press and a thermoplastic adhesive can be applied to the second side of velvet pile substrate 110. Adhesive layer 210 can be used for heat-sealing selected graphics. Adhesive layer 210 can include any substance and be applied using any technique that enables adhesive layer 210 to function as an adhesive suitable for the purposes of this invention. For example, adhesive layer 210 can be a thermoplastic film melted and adhered through use of heat-presses or calender rollers. As another example, adhesive layer 210 can be an adhesive powder that can be fused using non-contact infrared heaters or heated rolls or contact plates. As another example, adhesive layer 210 can be a hot melt adhesive applied to the second side of velvet pile substrate 110 via kiss roll technique.

Once adhesive layer 210 has been applied, velvet pile substrate 110 can optionally be etched and then cut out to a selected shape at step 360. Laser etching can be used to create dimensionality within the substrate by melting and fusing pile or surface fibers to create an indentation. Etching is an optional substep if texturizing the transfer 100 is desired. This may include laser etching or shading or other textured effects, etching the graphic to areas a recessed three-dimensional look, etc. One skilled in the art would understand the benefit of creating varying levels of depth using a digital process versus an analogue process like embossing. Velvet pile substrate 110 can be cut to a selected shape using any cutting technique suitable for the purposes of this invention. For example, velvet pile substrate 110 can be cut using a laser to help seal and fuse the edge. As another example, velvet pile substrate 110 can be cut using a die cut, rotary blade, or ultrasonic cutting technique. After being cut, velvet pile transfer 100 can packaged by placing a release sheet 220 overtop printed side of the velvet pile substrate 110 and graphic print 120. The release sheet 220 can be removed during or after the velvet pile transfer 100 is heat applied to a garment or soft good The foregoing process provides an applique capable of being digitally-printed by sublimation printing in a wide range of patterns, and yields a unique velvet pile transfer 100 which is sharp, colorfast, retains these attributes over time and can have varying depth levels by melting or fusing surface fibers by means of a laser.

The foregoing disclosure of embodiments of the embodiments of the present invention has been presented for purposes of illustration and description. It is not intended to be exhaustive or to limit the invention or its embodiments to the precise forms disclosed. Many variations and modifications of the embodiments described herein will be obvious to one of ordinary skill in the art in light of the above disclosure. The scope of the embodiments described here is to be defined only by the claims, and by their equivalents.

What is claimed is:

1. A method for manufacturing a thermal transfer, comprising:
   obtaining a high-loft pile-fiber material sheet having a sheet thickness in excess of at least 1.5 mm and a bulk density less than 500 g/m$^3$;
   registering the high-loft pile-fiber material sheet in a vacuum press;
   sublimation printing a graphic onto a second side of said high-loft pile-fiber material sheet from a sublimation paper without compressing the pile of the high-loft pile-fiber material sheet with the sublimation paper;
   applying a vacuum to a first side of said high-loft pile-fiber material sheet during said sublimation printing to thereby induct dye from said sublimation paper into the pile of said high-loft pile-fiber material sheet
   laminating an adhesive layer onto the first side of the high-loft pile-fiber material sheet;
   laser-cutting the high-loft pile-fiber material sheet into a selected shape;
   applying a release sheet over the second side of said high-loft pile-fiber material sheet.

2. A method for manufacturing a thermal transfer according to claim 1, wherein the high-loft pile-fiber material sheet is a velvet fabric.

3. A method for manufacturing a thermal transfer according to claim 1, wherein the high-loft pile-fiber material sheet is a chenille stitched fabric.

4. A method for manufacturing a thermal transfer according to claim 1, wherein the high-loft pile-fiber material sheet is a woven napped fabric.

5. A method for manufacturing a thermal transfer according to claim 1, wherein the high-loft pile-fiber material sheet is a knit napped fabric.

6. A method for manufacturing a thermal transfer according to claim 1, wherein the high-loft material sheet is a tufted fabric.

7. A method for manufacturing a thermal transfer according to claim 1, wherein the high-loft pile-fiber material sheet is a felted non-woven substrate.

8. A method for manufacturing a thermal transfer, comprising:
   obtaining a high-loft pile-fiber material sheet having a thickness in excess of 1.5 mm and a bulk density less than 500 g/m$^3$;
   registering the high-loft pile-fiber material sheet in a vacuum press;
   sublimation printing a graphic onto an opposing side of said high-loft pile-fiber material sheet from a sublimation paper without compressing the pile of the high-loft fiber-pile material sheet with the sublimation paper;
   applying a vacuum to one side of said high-loft pile-fiber material sheet during said sublimation printing to induct dye from said sublimation paper into the pile of said high-loft pile-fiber material sheet;
   laminating an adhesive layer onto the one side of the high-loft pile-fiber material sheet;
   laser-etching the printed side of said high-loft pile-fiber material sheet into a selected shape;
   laser-cutting the high-loft pile-fiber material sheet into a selected shape;
   applying a release sheet over the printed side of said high-loft pile-fiber material sheet.

9. A method for manufacturing a thermal transfer according to claim 8, wherein the high-loft pile-fiber material sheet is a velvet fabric.

10. A method for manufacturing a thermal transfer according to claim 9, wherein the high-loft pile-fiber material sheet is a chenille stitched fabric.

11. A method for manufacturing a thermal transfer according to claim 8, wherein the high-loft pile-fiber material sheet is a woven napped fabric.

12. A method for manufacturing a thermal transfer according to claim 8, wherein the high-loft pile-fiber material sheet is a knit napped fabric.

13. A method for manufacturing a thermal transfer according to claim 8, wherein the high-loft pile-fiber material sheet is a tufted fabric.

14. A method for manufacturing a thermal transfer according to claim 8, wherein the high-loft pile-fiber material sheet is a felted non-woven substrate.

\* \* \* \* \*